April 10, 1928.  1,665,827
R. TILLMANN
PACKING DEVICE FOR PRESSURE VESSELS
Filed Sept. 1, 1926
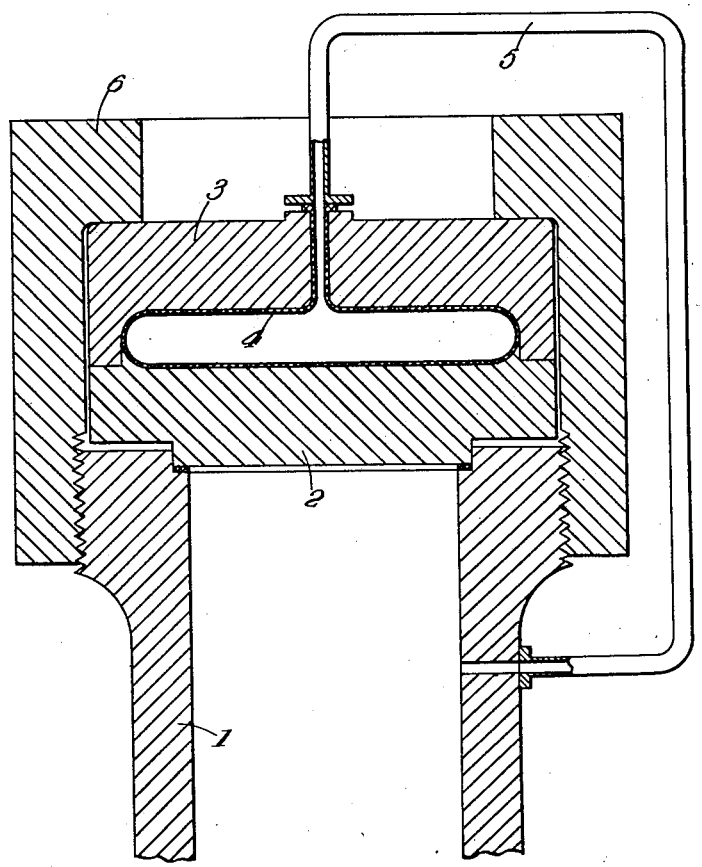
Inventor.
Richard Tillmann
per
William H. Young.
Attorney.

Patented Apr. 10, 1928.

1,665,827

UNITED STATES PATENT OFFICE.

RICHARD TILLMANN, OF MANNHEIM, GERMANY.

PACKING DEVICE FOR PRESSURE VESSELS.

Application filed September 1, 1926, Serial No. 133,073, and in Germany September 4, 1925.

It has already been proposed to press the packings of pressure vessels into position by hydraulic or pneumatic forces, use being made for the production of the closing force either of external pressures and pressing means or of the pressure and pressing medium of the pressure vessel itself which it is desired to pack or seal, and in this way so-called automatic closures are obtained. The transference of the pressing force to the closing member is effected by means of a piston, the diameter of which is determined according to the degree of closing pressure required in proportion to the working pressure to be packed. In all cases the outer periphery of the piston must be rendered fluid tight against the external pressure. In small diameters and moderate pressures this can be accomplished by means of a snug fit effected by grinding, but in the case of large diameters and high pressures stuffing boxes become absolutely essential. These, however, in the case of extreme working conditions can only be made reliable for work with great difficulty. In addition to this, according to the nature of the packing and the degree of tightness, they give strongly varying and completely uncontrollable resistances to movement and, unless work be done with a very great excess of pressure on the piston surface or of pressure fluid, the packing of the pressure chamber can easily be rendered a very questionable matter by the retardation or practical stoppage of the piston.

Now by means of the present invention all the defects referred to are obviated. The pressure medium does not come into direct contact with the surface of the piston, but the pressure medium is contained in a pressure bladder made of elastic material and this, upon its expansion due to the pressure medium introduced into it, first imparts the necessary closing force to the piston surface. The packing towards the outside by means of large stuffing boxes is rendered unnecessary and, as a natural consequence, the drawbacks connected therewith are eliminated. The packing in relation to the outside is effected by means of the pressure bladder.

In the accompanying drawing the invention is shown in one constructional form given by way of example. 1 is the pressure vessel it is desired to close, 2 is the closing cover or lid, 3 a supporting plate, 4 a bladder or bulb of elastic material such for example as copper, aluminum, lead, soft iron etc. with a union for a pipe 5 connected between the inner chamber of the pressure vessel and the pressure bulb, and 6 a nut for cushioning the supporting plate 3 and the cover or lid 2 against the vessel 1. After assembling the device the nut 6 is so tightened up that a slight pressing on the parts is obtained. Now if the inner chamber 1 be placed under pressure then the same pressure will prevail in the bladder 4 and cause the wall of the bladder to bear gently against the surfaces of the lid 2 and the under surface of the supporting plate 3 whereby the pressure is transferred to these parts of the device. Now if the internal diameter of the bulb is greater than the diameter of the packing between the lid and the vessel 1, then the closing force exerted upon the lid is greater than the force which presses the lid in an outward direction. If it be desired to open the vessel then all that is needed is after relieving the inner pressure, to unscrew the nut 6.

The displacements of the lid in an axial direction when opening and closing are, to the extent to which they have to be produced by the alterations in the shape of the bladder, very small as soon as the packing has once been formed. The remaining alterations in the form of the bladder each time the lid is pressed on are consequently also very small, so that a bladder will withstand a large number of pressing on phases. In addition to this the device can be so fashioned that, after relieving the pressure and removing the plate 3 the bladder will collapse to some extent, its lateral walls folding together in pleats towards the inside. Upon renewal of the pressure these walls will again be stretched and become smooth.

It is important, especially in the case of high pressures, that the surfaces of the lid and of the supporting plate, shall be such that the walls of the bladder will bear thereon in a perfectly even manner, so that no bending or tractive stresses may occur therein, with the exception of those which unavoidably result upon axial displacement of the lid or cover.

The screw thread, by means of which the nut anchors the packing device to the wall of the vessel, merely requires to be tightened up with such force as to exert a slight packing pressure upon the lid. The stresses upon the screw thread surfaces during the tightening of the nut are, consequently, slight. Certainly they are considerably larger as soon as the vessel is under pressure but, during this time, no movement of the nut takes place. The axial path, which is necessary for actually pressing down the lid, is so small that the nut need only be turned to the extent of a fraction of the circumference.

The device described possesses the special advantage that dismantling can be carried out very rapidly and the packing is produced with complete certainty. The construction and manipulation of very large covers in the case of vessels subjected to very high pressures is greatly facilitated by means of the invention because, as has been shown by experience, the application as hitherto of several screws for holding down the cover is very difficult in the case of large diameters and high pressures, and the opening and closing from time to time are tedious operations. The invention, therefore, is of special value for such vessels which have to be opened and closed at regular intervals if value be attached to the fact that as little time as possible should be lost in effecting these operations.

What I claim and desire to secure by Letters Patent of the United States is:—

1. A closing device for pressure vessels comprising a closing lid, a supporting plate therefor, and an elastic bladder-like body between the closing lid and the supporting plate, the elastic bladder-like body being supported on all sides by the closing lid and supporting plate.

2. The closing device for pressure vessels recited in claim 1 wherein the elastic bladder-like body communicates with the pressure vessel and has a diameter greater than the effective packing diameter of the closing lid so that there will always be a positive closing pressure on the lid.

3. The closing device for pressure vessels recited in claim 1 including means for forcing the supporting plate against the closing lid so that an initial pressure is exerted on the closing lid.

RICHARD TILLMANN.